United States Patent
Buffa et al.

(10) Patent No.: US 10,569,982 B2
(45) Date of Patent: Feb. 25, 2020

(54) METHOD AND APPARATUS FOR JOINING THE PLY OF A REEL OF PAPER IN DEPLETION WITH THE INITIAL FLAP OF A NEW REEL

(71) Applicant: GAMBINI S.p.A., Milan (IT)

(72) Inventors: Giovanni Buffa, Ponte Buggianese (IT); Fabio Picchi, Lammari (IT)

(73) Assignee: GAMBINI S.P.A., Milan (IT)

(*) Notice: Subject to any disclaimer, the term of this patent is extended or adjusted under 35 U.S.C. 154(b) by 174 days.

(21) Appl. No.: 15/849,814

(22) Filed: Dec. 21, 2017

(65) Prior Publication Data
US 2018/0179008 A1 Jun. 28, 2018

(30) Foreign Application Priority Data
Dec. 22, 2016 (IT) .................... 102016000130218

(51) Int. Cl.
| | |
|---|---|
| B65H 19/18 | (2006.01) |
| B65H 19/10 | (2006.01) |
| B65H 23/04 | (2006.01) |
| H02N 13/00 | (2006.01) |

(52) U.S. Cl.
CPC ........... *B65H 19/18* (2013.01); *B65H 19/102* (2013.01); *B65H 23/048* (2013.01); *H02N 13/00* (2013.01)

(58) Field of Classification Search
CPC .. B65H 19/18; B65H 19/102; B65H 19/1894; B65H 19/1863; B65H 19/1836; B65H 23/048; H02N 13/00
See application file for complete search history.

(56) References Cited

U.S. PATENT DOCUMENTS

| | | | |
|---|---|---|---|
| 2,769,600 A | 11/1956 | Kwitek et al. | |
| 4,852,820 A * | 8/1989 | Looser ................... | B65H 19/28 242/527.2 |
| 5,679,207 A * | 10/1997 | Palone ............... | B65H 19/1852 156/159 |
| 6,264,130 B1 | 7/2001 | Hartley, Jr. | |
| 2004/0129374 A1 | 7/2004 | Hebels et al. | |
| 2005/0051662 A1 | 3/2005 | Meyer et al. | |

FOREIGN PATENT DOCUMENTS

| | | |
|---|---|---|
| GB | 1535389 A | 12/1978 |
| WO | WO2012074971 A2 | 6/2012 |

* cited by examiner

*Primary Examiner* — Sang K Kim
(74) *Attorney, Agent, or Firm* — King & Schickli, PLLC

(57) ABSTRACT

The present invention concerns a method for joining the ply of a reel of paper in depletion with the initial flap of a new reel, as well as an apparatus adapted for carrying out such a method.

Thanks to the method according to the present invention, and to the apparatus suitable for carrying it out, the joining of the reels takes place without using gluing means, like for example the double-sided tape used in known methods, avoiding the relative drawbacks, the adhesion between the plies of the reels to be joined taking place by electrostatic attraction.

9 Claims, 3 Drawing Sheets

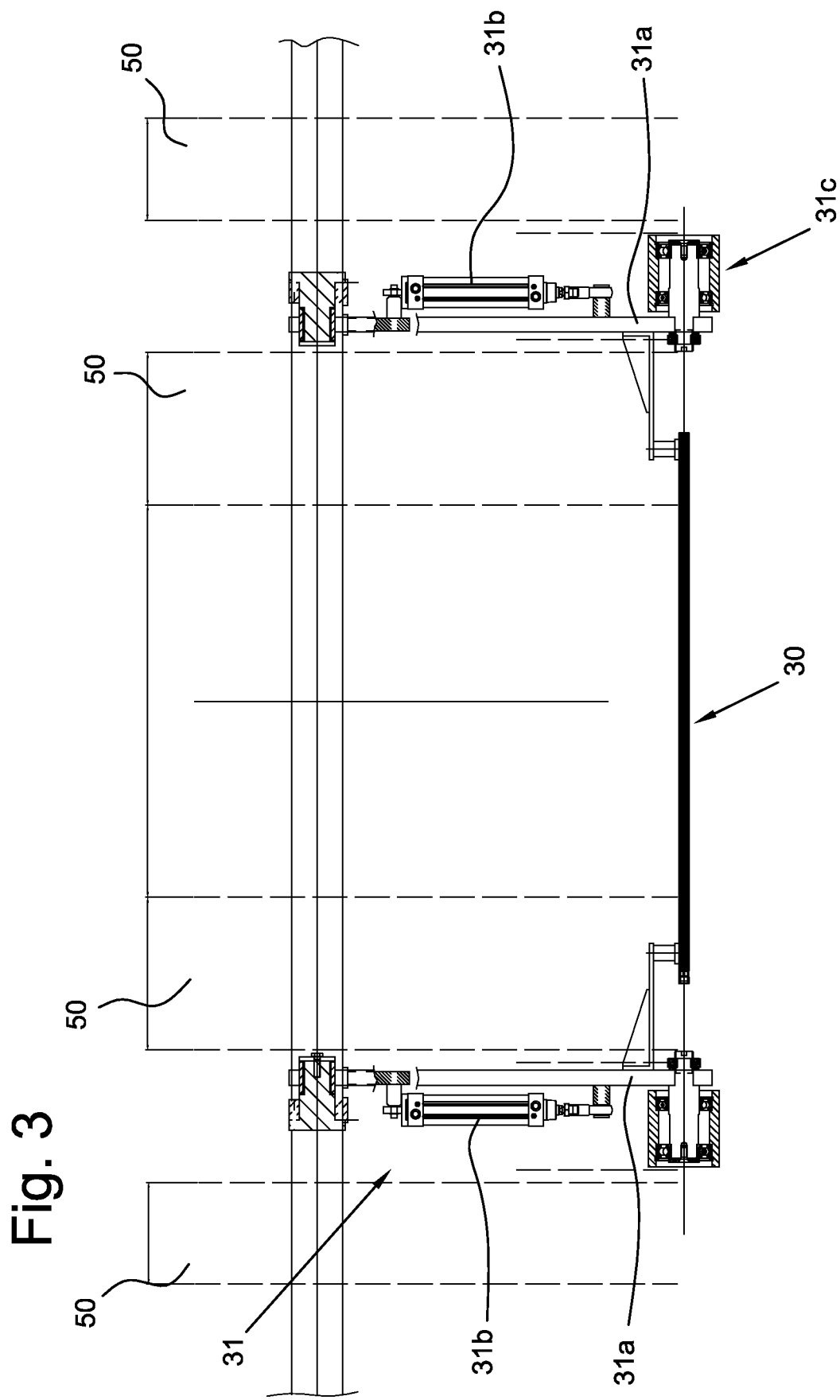

METHOD AND APPARATUS FOR JOINING THE PLY OF A REEL OF PAPER IN DEPLETION WITH THE INITIAL FLAP OF A NEW REEL

FIELD OF THE INVENTION

The present invention concerns a method for joining the ply of a reel of paper in depletion with the initial flap of a new reel, as well as an apparatus adapted for carrying out such a method.

More specifically, the present invention concerns a method and an apparatus suitable for obtaining the joining of reels of paper to ensure the continuous production of rolls of toilet paper, or of rolls of paper for domestic use or similar products.

STATE OF THE ART

In the field of the preparation of rolls of paper, toilet paper, paper for domestic use or similar, the paper that is used to make the single roll, i.e. "log", is in general unwound from a reel.

The starting reel, in general having a diameter that can for example be 1700 mm up to 3000 mm, is arranged on a suitable support and unwinding group.

When the reel has been completely unwound it must be replaced by a new reel, however this replacement operation currently involves manual interventions of cutting, connection of the ply of a reel of paper in depletion with the initial flap of a new reel through arrangement of a gluing band and the subsequent restoration of the unwinding operation. Alternatively, a knot is tied between the two flaps of paper.

Carrying out such a joining operation takes a long time and particularly the worker in charge of joining must have good manual skill to carry out such a function in an optimal manner.

The correct positioning of the adhesive band also results in some problems if not carried out with due expertise. If the knot is tied it is necessary to make it so that it can easily pass between the rollers of the successive machines and this is not easy to do.

From the state of the art apparatuses are also known that carry out the joining operations of the ply of a reel of paper in depletion with the initial flap of a new reel in an automated manner.

The same Applicant is the owner of granted European patent EP 1172320 B1 that describes an apparatus for joining a reel of paper in depletion with the initial flap of a new reel comprising a cutting group of the ply of the reel in depletion, a roller that presses the ply of the reel in depletion on the initial flap of the new reel which is in advance equipped with a double-sided tape.

Such a known method that foresees the use of double-sided tape to carry out the joining of the reels nevertheless has some drawbacks.

The double-sided tape must be applied onto the free flap of the new reel so as to ensure that during the movement of the reel itself the flap is not free to detach from the reel risking compromising the correct adhesion to the free flap of the reel in depletion. Such a step of the method does however have the drawback of the risk of the double-sided tape, or glue residues, being able to transfer onto the wound paper below and/or to the components of the machines, for example of the rewinder, qualitatively damaging the end product that must be discarded.

Furthermore, a drawback that affects known methods that foresee the use of double-sided tape or similar gluing means to ensure the adhesion of the plies of the reels consists of the need to prepare the new reel with the double-sided tape, in particular having to preferably foresee to make the double-sided tape adhere at least at the support belts of the new reel, so that the pressure exerted by the belts ensures the adhesion of the double-sided tape to the ply of the reel in depletion. The arrangement of the double-sided tape on the new reel is also a wasteful operation in terms of time.

Last but not least, a further drawback that affects known methods that foresee the use of double-sided tape to carry out the joining of the reels is represented by the fact that if the flap of the new reel tears or is damaged due to the presence of the double-sided tape or during the adhesion of the two free flaps, it is necessary to pass the paper back into the machine to repeat the process, and the preparation operation takes over an hour.

SUMMARY OF THE INVENTION

The main task of the present invention is to overcome the drawbacks of known methods and apparatuses for joining a reel of paper in depletion with the initial flap of a new reel.

Within such a task, the purpose in particular of the present invention is to provide a method for joining a reel of paper in depletion with the initial flap of a new reel that makes it possible to completely avoid the use of any gluing means, for example a double-sided tape, for joining the two reels.

Another purpose of the present invention is to provide a method for joining two reels that involves faster actuation times with respect to known methods.

Last but not least, another purpose of the present invention is to provide an apparatus for joining a reel of paper in depletion with the initial flap of a new reel that allows the method, also object of the invention, to be carried out in an automated manner.

These and other purposes are accomplished according to the present invention by a method for joining a reel of paper in depletion with the initial flap of a new reel, comprising a step consisting of obtaining the adhesion of the plies of the two reels by electrostatic attraction.

Preferably, the method according to the present invention also comprises the following steps:

during the step of ejecting a first depleted reel, tensioning a ply of said first reel through a tensioning group;

arranging an electrostatic element able to accumulate an electrostatic charge;

charging said electrostatic element with an electrostatic charge;

arranging a second reel to be unwound and to be joined to said first reel in depletion;

positioning and unwinding said second reel so as to overlap the free flap of said second reel to the upper side of said ply of said first reel in depletion;

moving said electrostatic element closer to the overlapping plies of said reels so as to induce a polarization state in said plies;

unwinding both of the reels so that said free flap of said second reel and said ply of said first reel in depletion, overlapping, pass at said electrostatic element electrostatically charged thus obtaining the joining by electrostatic attraction of the two plies.

The method according to the present invention also advantageously comprises a step consisting of conveying the two overlapping and electrostatically joined plies of said two reels to a movable knurling unit comprising a series of pins or steel rollers, arranged transversally with respect to the advancing direction of the ply of the reel, configured to selectively engrave the paper longitudinally for strips of a few millimetres, contributing to keeping the plies of the two joined reels joined together.

Another object of the present invention is an apparatus adapted for carrying out the method according to the invention.

The apparatus comprises at least one transfer and tensioning unit of said first reel in the ejection step adapted for tensioning a ply of said first reel advantageously when it is depleted, a support and movement device of a second reel to be unwound adapted for unwinding the ply of said second reel so as to overlap it to the ply of said first reel and at least one movable electrostatic element configured to be positioned adjacent to the overlapping plies of said reels.

Preferably, said apparatus further comprises at least one movable knurling unit.

LIST OF FIGURES

The characteristics and advantages of the method for joining reels as well as of the apparatus adapted for carrying out the method according to the present invention will become clearer from the following detailed description, given as a non-limiting example, referring to the attached schematic drawings, in which:

FIG. 3 shows a schematic plan view of the support group of the electrostatic element forming part of the apparatus for joining reels according to the present invention.

DETAILED DESCRIPTION OF THE INVENTION

Figure 1:
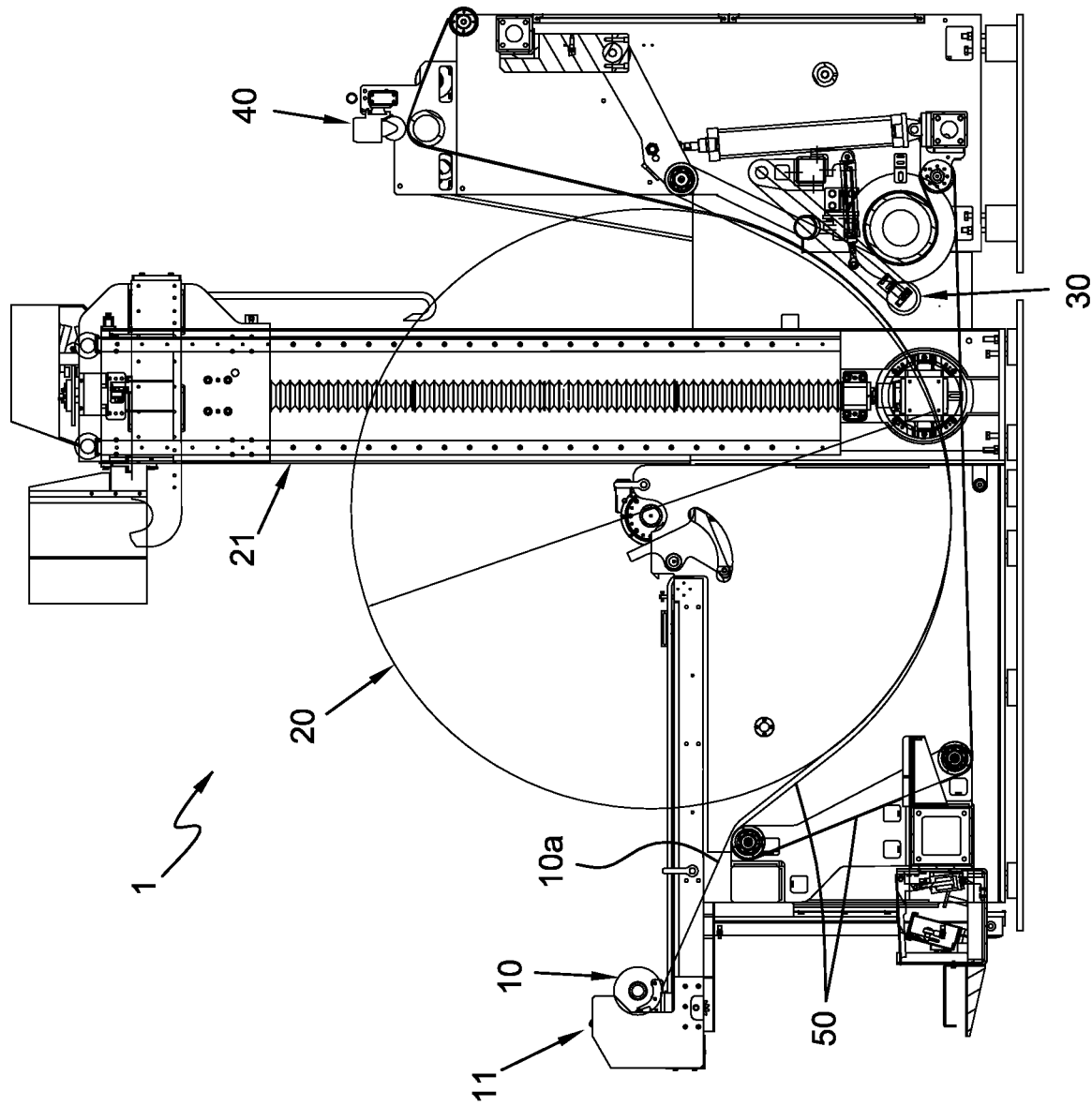
FIG. 1 represents an overall side view of the apparatus for joining reels according to the present invention in which a first reel in depletion and a second reel to be unwound having a diameter, for example, of 2500 mm are represented.

With reference to the attached figures, an apparatus 1 for joining reels of paper 10, 20 according to the present invention comprises at least one transfer and tensioning unit 11 for a first reel 10 being unwound adapted for tensioning a ply 10a of said first reel in depletion, a support and movement device 21 of a second reel 20 to be unwound, at least one movable electrostatic element 30 configured to be positioned adjacent to the lower face of said ply 10a of said first reel 10, at least one movable knurling unit 40 comprising a plurality of pins or steel rollers that, engraving the paper longitudinally for strips of a few millimetres, contribute to keeping the plies joined.

The joining apparatus 1 according to the present invention comprises a system of belts 50 for supporting the reel being unwound, according to what is known in unwinders.

The electrostatic element 30 preferably comprises a bar suitable for being electrostatically charged, for example made of plastic material, and connected to an electrical apparatus, not represented, capable of electrostatically charging said bar.

Advantageously, said electrostatic bar 30 is supported by a movement and positioning unit 31, which in turn preferably comprises a pair of movable positioning arms 31a each moved by relative hydraulic means 31b.

Each of said movable positioning arms 31a supports one of the two ends of said electrostatic bar 30.

The movement and positioning unit 31 of the electrostatic bar 30 is configured so as to be able to be positioned close to the lower face of the plies of the reels being unwound.

Since, as stated, at the bottom of the ply of the reel being unwound, to support such a ply, a plurality of mutually parallel belts 50 are provided, the electrostatic element 30 will advantageously be positioned under the support belts 50, and a distance from the ply of the reel that can also be a few millimetres, for example 5 mm, so as to optimise the induction effect of the electrostatic charge in the paper of the reel.

With particular reference to FIG. 3, in accordance with the preferred embodiment of the present invention illustrated here as an example, the movement and positioning unit 31 of the electrostatic bar 30 can advantageously comprise one or more spacer rollers 31c adapted for resting on the lower face of the overlapping plies being unwound so as to keep the electrostatic bar 30 supported by said movement and positioning unit 31 at a constant distance from the overlapping plies.

In particular, one of said spacer rollers 31c can be provided at each of said movable positioning arms 31a. Each of said spacer rollers 31c will preferably be idly associated with the respective movable arm 31a, supported by a suitable system of bearings.

By suitably sizing the movable arms 31a and the spacer rollers 31c it is ensured that during operation the electrostatic bar 30 is constantly at a predetermined distance from the ply of the reel.

Of course, different arrangements of the bar 30 and of the relative movement and positioning unit 31 can be foreseen due to different configurations thereof.

For example, instead of a bar extending mainly longitudinally it is possible to foresee a plate-like electrostatic element, without thereby departing from the scope of the present invention.

The system of belts foresees that as the reel progressively unwinds, and therefore its diameter reduces, the system of belts 50 follows such a variation of diameter.

Figure 2:
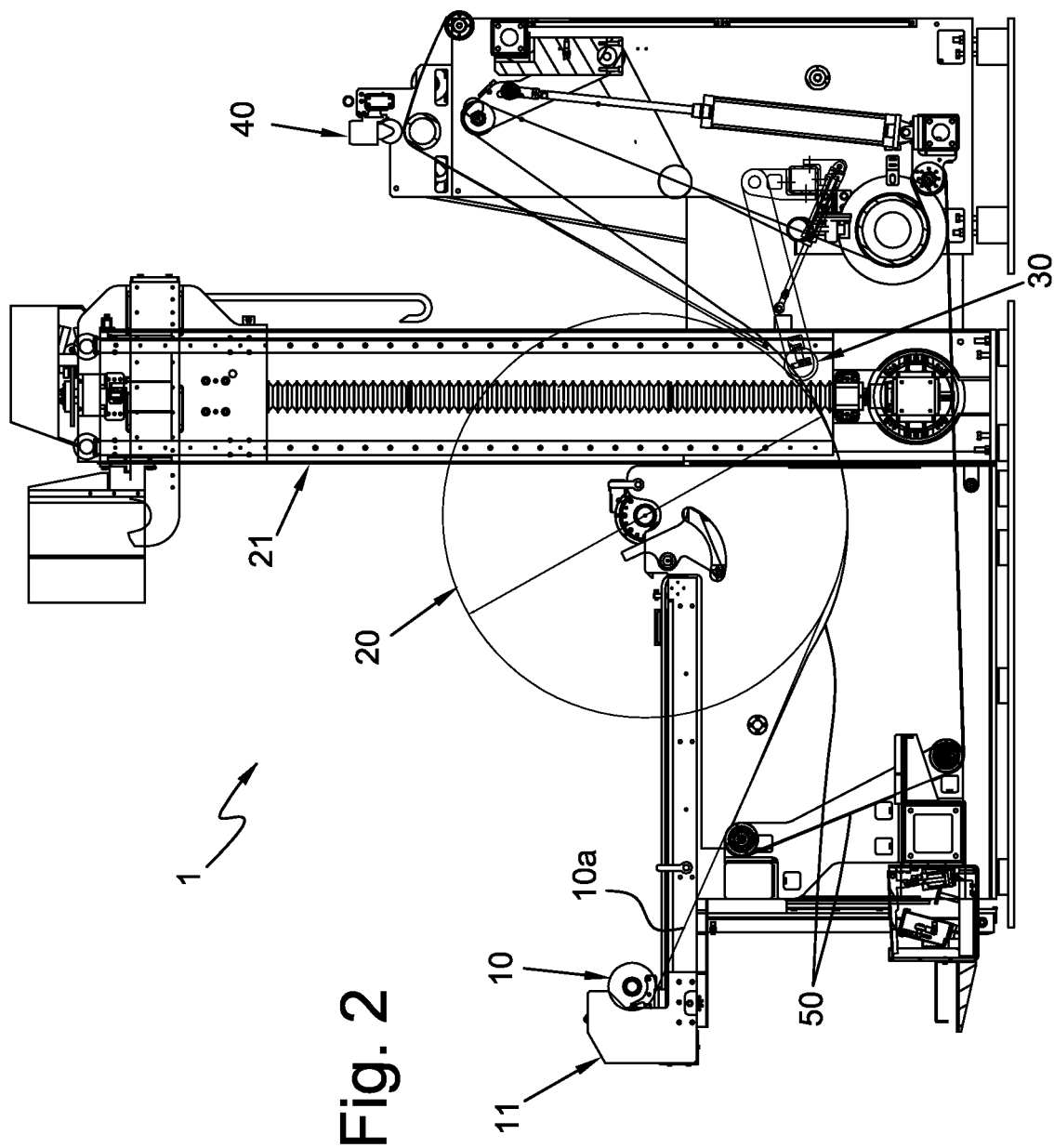
FIG. 2 represents an overall side view of the apparatus for joining reels according to the present invention in which a first reel in depletion and a second reel to be unwound having a diameter, for example, of 1700 mm are represented.

It is sufficient to compare FIGS. 1 and 2 to see how a different diameter of the reel being unwound corresponds to a different tension state of the belts 50.

In the same way and again comparing FIGS. 1 and 2 it can be seen that thanks to the movement and positioning unit 31, the electrostatic element 30 according to the present invention is capable of modifying its position almost always remaining close to the reel even when the latter reduces its diameter after unwinding.

In accordance with the preferred embodiment of the apparatus 1 according to the present invention shown in the attached figures, said movement and positioning unit 31 of said electrostatic element 30 is associated with the main structure of the apparatus 1.

The transfer and tensioning unit 11 of said first reel 10 is configured to move said first reel 10 so that when it is close to being depleted and the joining with a new reel 20 must be carried out, the first reel 10 is moved, to the left with reference to the example of FIGS. 1 and 2, thus allowing the support and movement device 21 of a second reel 20 to be unwound to translate vertically downwards, positioning said second reel 20 in the unwinding position, again according to what is shown as an example in FIGS. 1 and 2.

With reference to the figures the meaning of the terms upper, lower, top, bottom is therefore clear. The reference is that shown in the figures, where for example the upper face of the ply 10a of said first reel 10 is that which fits together with said second reel 20, whereas the lower face of said ply 10a is that which faces towards the belts 50.

The method carried out by the apparatus 1 for joining a reel of paper 10 in depletion with the initial flap of a new reel 20, according to the present invention, comprises the following steps:

during the unwinding of a first reel 10 in depletion tensioning a ply 10a of said first reel 10;

arranging an electrostatic element 30 able to accumulate an electrostatic charge and charging said electrostatic element 30 with an electrostatic charge;

arranging a second reel 20 to be unwound and to be joined to said first reel 10 in depletion;

positioning and unwinding said second reel 20 so as to overlap the initial free flap of said second reel 20 to the upper face of said ply 10a of said first reel 10 in depletion;

moving said charged electrostatic element to the lower face of said ply 10a of said first reel 10 in depletion in the unwinding step so as to induce an electrostatic polarization state in said ply 10a of said first reel;

unwinding both of the reels so that said free flap of said second reel 20 overlaps said ply 10a of said first reel 10 in depletion and passes at said electrostatic element 30 thus obtaining the joining by electrostatic attraction of the two plies.

The method according to the present invention also advantageously comprises a step consisting of conveying the two overlapping electrostatically joined plies of said two reels 10, 20 to a movable knurling unit 40 comprising a series of pins or rollers, arranged transversally with respect to the advancing direction of the ply of the reel, preferably made of steel and configured to selectively engrave the paper longitudinally for strips of a few millimetres, contributing to keeping the plies of the two joined reels joined together.

The movable knurling unit 40 is configured to be able to be moved towards and away from the ply of the reel so as to operate selectively, so that the knurling can advantageously engage only a limited portion of the two overlapping plies.

The step of knurling is advantageously used in the case of paper of a particular type, for example of greater thickness, with which the joining effect of the electrostatic energy has a lesser effect.

The method carried out by the apparatus according to the present invention comprises a step of cutting the ply 10a of said first reel 10 once the joining of said ply with the free flap of said second reel 20 has been carried out.

The ply 10a of said first reel 10 will be cut at a point upstream of the joining area, with respect to the advancing direction of the plies.

For this purpose, said apparatus 1 will comprise a cutting group, not illustrated in the attached figures, preferably positioned in the lower part of the unwinder.

The cutting group can preferably be contained in a container element, for example box-like, closed by an openable cover by means of a pneumatic piston or similar devices.

The cutting element at that point can protrude a cutting element consisting of a cross-member that is mounted on two linear and motorised guides, comprising a cutting element, for example an extractable serrated blade.

Advantageously, the new reel 20 will comprise means suitable for holding its initial flap adjacent to the reel itself in the steps that precede the adhesion of said flap to the ply 10a of said first reel 10.

From the description given up to here the steps of the method and the characteristics of the apparatus adapted for carrying out such a method for joining two reels of paper object of the present invention are clear, just as the relative advantages are also clear.

Moreover, it should be understood that the apparatus thus described can undergo numerous modifications and variants, all of which are covered by the scope of protection defined by the attached claims.

Moreover, all of the details can be obtained or replaced by technically equivalent elements.

The method and apparatus for joining reels according to the present invention achieve the task and the purposes highlighted earlier and obtain the described advantages.

The invention claimed is:

1. A method for joining a ply (10a) of a first reel of paper (10) in depletion with an initial flap of a new reel (20) by achieving the adhesion of overlapping plies of the two reels (10, 20) by an electrostatic attraction, further comprising the steps of:

during the ejection of said first depleted reel (10), tensioning the ply (10a) thereof using a tensioning group (11);

arranging an electrostatic element (30) able to accumulate an electrostatic charge and load said electrostatic element (30) with an electrostatic charge;

arranging the second reel (20) to be unwound and joined to said first reel (10) in depletion;

overlapping the free flap of said second reel (20) to the upper side of said ply (10a) of said first reel (10) in depletion;

moving said electrostatic element (30) close to the overlapping plies of said reels being unwound so as to induce a polarization state in said plies which causes said electrostatic attraction;

unwinding both reels so that said free flap of said second reel (20) and said ply (10a) of said first reel (10) in depletion, overlapping, pass at said electrostatic element (30) electrostatically charged, thus obtaining the joining by said electrostatic attraction of the overlapping plies of the two reels.

2. The method according to claim 1, further comprising a step of knurling of the overlapping plies of the two reels (10, 20) joined by said electrostatic attraction.

3. The method according to claim 2, wherein said step of knurling the flaps of the two reels takes place by steel rollers.

4. An apparatus (1) for joining a ply (10a) of a first reel of paper (10) in depletion with an initial flap of a new reel (20) according to the method of claim 1, comprising at least one transfer and tensioning unit (11) for said first reel (10) being ejected adapted to tension said ply (10a) of said first reel (10) depleted, at least one support and movement device (21) of said second reel (20) to be unwound adapted to unwind the ply of said second reel (20) so as to overlap it to the ply (10a) of said first reel (10), at least one movable electrostatic element (30) configured to be placed adjacent to the overlapping plies of said reels (10, 20).

5. The apparatus (1) according to claim 4, wherein said movable electrostatic element (30) comprises a bar suitable for being electrostatically charged.

6. The apparatus (1) according to claim 5, wherein said electrostatic bar (30) is supported by a movement and positioning unit (31) in turn comprising a pair of movable positioning arms (31*a*) moved each by respective hydraulic means (31*b*).

7. The apparatus according to claim 6, further comprising one or more spacer rollers (31*c*) associated to said movable positioning arms (31).

8. The apparatus (1) according to claim 4, further comprising at least one movable knurling unit (40).

9. The apparatus (1) according to claim 8, wherein said movable knurling unit (40) of comprises steel rollers adapted to selectively engrave the paper lengthwise.

\* \* \* \* \*